United States Patent [19]

Vogt, III

[11] Patent Number: 5,325,447
[45] Date of Patent: Jun. 28, 1994

[54] HANDWRITTEN DIGIT NORMALIZATION METHOD

[75] Inventor: Robert C. Vogt, III, Ann Arbor, Mich.

[73] Assignee: Environmental Research Institute of Michigan, Ann Arbor, Mich.

[21] Appl. No.: 769,740

[22] Filed: Oct. 2, 1991

[51] Int. Cl.⁵ .................. G06K 9/42; G06K 9/32; G06K 9/48
[52] U.S. Cl. ....................... 382/47; 382/46; 382/22; 395/102; 345/128
[58] Field of Search .............. 382/46, 47, 49, 41, 382/3, 13, 22, 9; 395/102, 136, 137, 138, 139; 340/727, 731, 741, 771, ; 345/126, 128, 129, 130, 131, 139

[56] References Cited

U.S. PATENT DOCUMENTS

| | | | |
|---|---|---|---|
| 4,317,109 | 2/1982 | Odaka et al. | 340/146.3 |
| 4,461,029 | 7/1984 | van Bilzem et al. | 382/25 |
| 4,523,331 | 6/1985 | Asija | 382/18 |
| 4,558,461 | 12/1985 | Schlang | 382/9 |
| 4,607,386 | 8/1986 | Morita et al. | 382/13 |
| 4,748,676 | 5/1988 | Miyagawa et al. | 382/46 |
| 4,845,768 | 7/1989 | Kochert et al. | 382/46 |
| 5,054,098 | 10/1991 | Lee | 382/46 |

OTHER PUBLICATIONS

Moment Normalization of Handprinted Characters; R. G. Casey IBM Journal of Research and Development, Sep. 1970, pp. 548-552.

*Primary Examiner*—David K. Moore
*Assistant Examiner*—Michael Cammarata
*Attorney, Agent, or Firm*—Krass & Young

[57] ABSTRACT

A handwritten character image normalization technique provides predetermined pixel dimensions and a normalized skew. The skew slope of the input image is calculated. This skew slope is employed to determine the bounds of the smallest parallelogram which completely encloses all of the stroke pixels of the input image. This parallelogram has a first pair of opposed horizontal sides and a second pair of opposed sides having the skew slope. The stroke pixels of this parallelogram are then mapped into the standard size horizontal row and vertical column pixel dimensions using horizontal and vertical scaling factors determined from the parallelogram dimensions and the standard dimensions. This mapping employs a subpixel grid of the normalized pixels. Candidate stroke pixels are identified which correspond to any part of a stroke pixel of the input image. A candidate stroke pixel is set to a stroke pixel if and only if the number of such subpixels mapped into a stroke pixel of the input image exceeds a predetermined number.

8 Claims, 3 Drawing Sheets

HANDWRITTEN DIGIT NORMALIZATION METHOD

The United States government has a nonexclusive right to use this invention pursuant to contract 104230-86-H-0042, awarded by the U.S. Postal Service Office of Advanced Technology.

TECHNICAL FIELD OF THE INVENTION

The technical field of the present invention is that of optical character recognition and more particularly recognition of handwritten digits.

BACKGROUND OF THE INVENTION

There are many instances where it would be useful or desirable to provide a computer readable form of a document not available in a compatible computer readable form. Normally it is the case that the document is not available in machine readable form. This could be because the document was handwritten or typewritten and thus no computer readable form exists, or it could be because the computer readable form is not available. In some instances this is a "foreign" document, i.e., a computer readable form does exist but document was produced on an incompatible computer system. In some instances, such as facsimile transmission, a simple optical scan of the document can produce the required form. In most instances the form most useful for later use and decision making is a separate indication of each character of the document.

The field of optical character recognition deals with this problem. The optical character recognizer scans the document in some fashion to produce an electrical indication of the marks of the document. A computer analyzes this indication of the marks to produce an indication of each character of the document. It is within the current state of the art to produce relatively error free indication of many typewritten and printed documents. The best systems of the prior art are capable of properly distinguishing several differing type fonts and of reading kerned text. This is not the case for unconstrained handwritten characters.

The problem of properly reading unconstrained handwritten characters is difficult because of the great variability of the characters. One person may not write the same character exactly the same every time. The variability between different persons writing the same character is even greater than the variability of a single person. In addition to the variability of the characters themselves, handwritten text is often not cleanly executed. Thus characters may overlap horizontally. Loops and descenders may overlap vertically. Further, the individual written lines may be on a slant or have an irregular profile. Thus recognition of handwritten characters is a difficult task.

An example of a field where recognition of handwritten characters would be very valuable is in mail sorting. Each piece of mail must be classified by destination address. A large volume of typewritten and printed mail is now read and sorted using prior art optical character recognition techniques. There remains roughly 15% of current U.S. mail that is hand addressed. Present technology uses automated conveyer systems to present these pieces of mail, one at a time, to an operator who views the address and enters a code for the destination. This is the most labor intensive and slowest part of the entire mail sorting operation.

Sorting of handwritten mail is an area having a unique set of characteristics. First, because of the problem of user acceptance it is not feasible to place further constraints on the address. Thus address lines or individual character boxes, which would be useful in regularizing the recognition task, are ruled out. On the other hand, there already exists a relatively constrained portion of the current address. The 5 digit ZIP code employed in a most handwritten destination addresses provides all the information needed for the primary sorting operation. This information is relatively constrained because the ZIP code consists of only digits. In addition the ZIP code is usually located at the end of the last line of the destination address, thus reducing the task of proper location.

It would thus be useful in the art to provide a manner of normalizing unconstrained handwritten digits to ease the task of recognition.

SUMMARY OF THE INVENTION

The present invention is a handwritten digit image normalization technique to predetermined pixel dimensions. This normalization tends to decrease the differences between images of the same digit and provides a standardized image size.

The normalization technique takes a character image of unconstrained horizontal row and vertical column pixel dimensions having stroke and background pixels and maps it into a standard horizontal row and vertical column pixel dimensions. This normalization technique also normalizes the character skew. The process determines a skew slope of the character image corresponding to the slant angle of the stroke pixels of the character image. This skew slope is employed to determine the bounds of the smallest parallelogram which completely encloses all of the stroke pixels of the character image. This parallelogram has a first pair of opposed horizontal sides and a second pair of opposed sides having the skew slope. The process is completed by mapping the stroke pixels of this parallelogram into the standard size horizontal row and vertical column pixel dimensions.

The skew slope is determined from statistical measures of the character image. These statistical measures include: the standard deviation of the vertical dimension of the stroke pixels of the character image; the standard deviation of the horizontal dimension of the stroke pixels; and the correlation of the vertical and horizontal dimensions of the stroke pixels. The skew slope is calculated as the quotient of the standard deviation of the vertical dimension of the stroke pixels divided by the product of the standard deviation of the horizontal dimension of the stroke pixels and the correlation of the vertical and horizontal dimensions of the stroke pixels. This provides a measure of the slant angle of that particular character. In the preferred embodiment the absolute value of the calculated skew slope is limited to less than a predetermined number such as 10,000. Note that a vertical line has an infinite slope, thus this technique limits the calculate skew slope for the vertical case to a manageable number.

The bounds of the smallest parallelogram which completely encloses all of the stroke pixels of the character image is determined as follows. A central point of the stroke pixels of the character image is determined. This is preferably the average of the centroid of stroke pixels and the center of the minimum bounding box. This central point is preferably rounded to the nearest integral pixel. A skew axis is formed having a slope equal to the skew slope and passing through this central point. For each row having stroke pixels the leftmost and rightmost stroke pixels are determined. The horizontal distance of the top-left corner and the bottom-left corner of each leftmost stroke pixel of each horizontal row of pixels to the skew axis is calculated. The left side of the parallelogram is a line parallel to the skew axis disposed to the left of the skew axis by the maximum of these distances. Likewise, the right side of the parallelogram is a line parallel to the skew axis disposed to the right of the skew axis by the maximum of the horizontal distances of the top-right corner and the bottom-right corner of each rightmost stroke pixel of each horizontal row to the skew axis.

The mapping process transforms the stroke pixels within the parallelogram into the standard size horizontal row and vertical column pixel dimensions. The process includes calculating the length of each of the sides of the parallelogram parallel to the skew axis. A vertical scaling factor is set equal to the quotient of the standard vertical column pixel dimensions divided by the length of one of these sides. The width of the parallelogram permits calculation of a horizontal scaling factor equal to the quotient of the standard horizontal column pixel dimensions divided by this width. The horizontal scaling factor is preferably limited to no more that twice the vertical scaling factor. This prevents undue broadening of narrow characters and amplification of aliasing errors.

The process of mapping the parallelogram to the standard size preferably employs a subpixel grid. First the vertical and horizontal scaling factors are used to identify each stroke candidate pixel within the standard size horizontal row and vertical column pixel dimensions corresponding to any part of a stroke pixel of the character image. Each such identified candidate stroke pixel is divided into an array of subpixels. A 5 by 5 subpixel grid is suitable. The number of subpixels of each candidate stroke pixel which maps into any part of a stroke pixel of the character image is counted. The candidate stroke pixel is set to a stroke pixel if and only if the number of such subpixels mapped into a stroke pixel of the character image exceeds a predetermined number. This predetermined number is preferably about 40% of the number of subpixels per candidate pixel.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
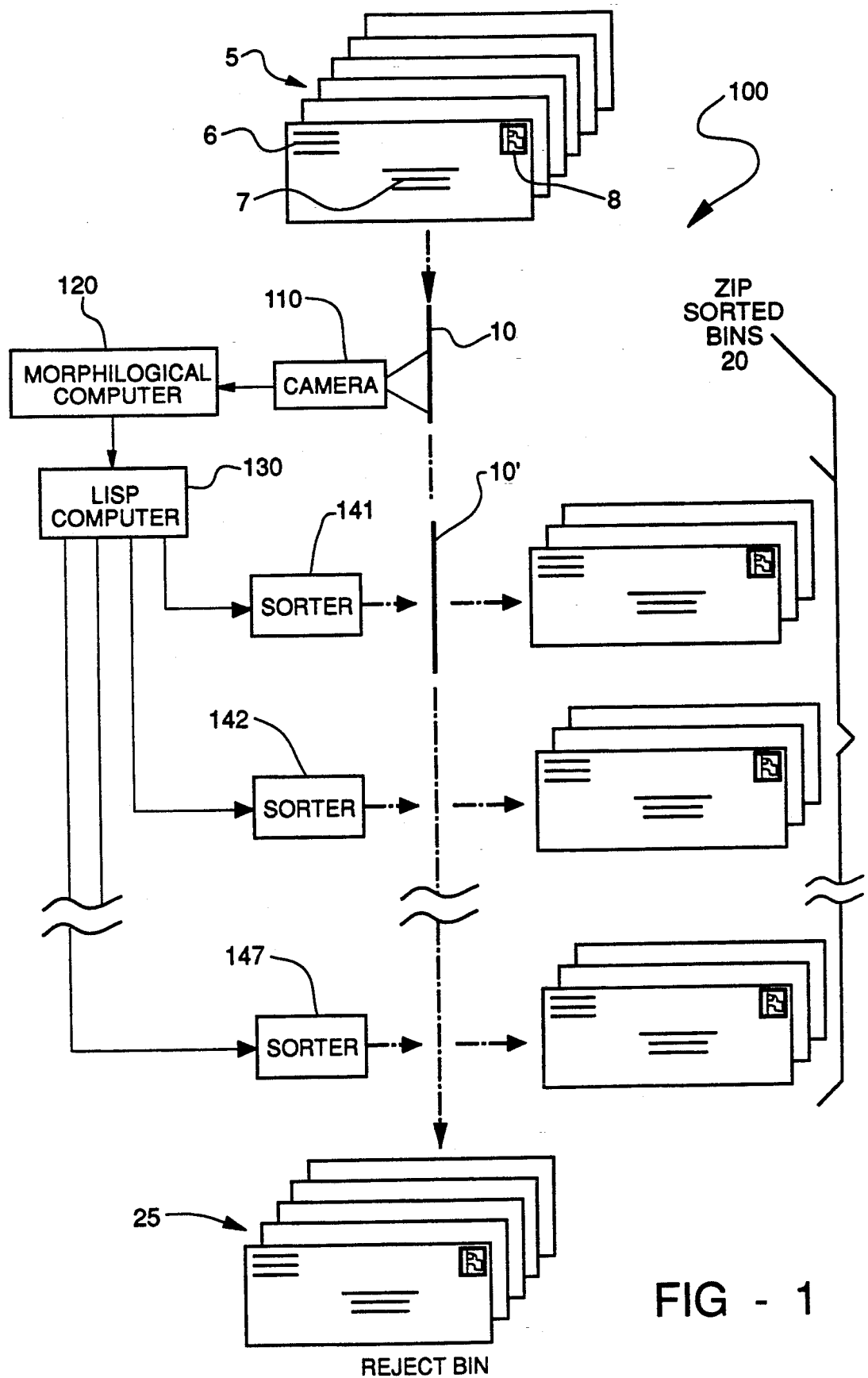
FIG. 1 illustrates the zip code recognition hardware of the preferred embodiment of the present invention.

FIG. 1 illustrates the general structure of the handwritten digit recognition system 100 according to the preferred embodiment of the present invention. An input stack 5 of unsorted letters, each of which may include a handwritten ZIP code, serves as the input to the handwritten digit recognition system 100. Each letter in input stack 5 typically includes a return address block 6, a destination address block 7 and a stamp 8. An individual letter 10 is extracted from input stack 5 and fed to handwritten digit recognition system 100. Handwritten digit recognition system 100 attempts to locate the ZIP code of the destination address, and recognize the individual digits. Upon successful recognition of any ZIP code, handwritten digit recognition system 100 deposits each letter 10 into one of a set of ZIP sorted bins 20 based upon the recognized ZIP code digits. If no ZIP code was found or if the recognition process failed in some other manner letter 10 is deposited into reject bin 25.

Handwritten digit recognition system 100 includes camera 110, computer 120 and plural sorters 141, 142 . . . 147. Handwritten digit recognition system 100 operates as follows. Individual letters 10 are removed from input stack 5 and drawn past the field of view of camera 110. This operation preferably involves the use of some sort of track or conveyer system for carrying the letters. Such systems are well known in the art and will not be further described here. Letter 10 passes by the plural sorters 141, 142 . . . 147 and is either deposited into one of the ZIP sorted bins 20 by one of the sorters or is deposited into reject bin 25 if none of the sorters 141, 142 . . . 147 operates. Thus the mail is sorted into appropriate stacks.

Camera 110 forms a gray scale image of the entire envelope. This image is preferably of the raster scan type with each picture element or pixel represented by a plurality of data bits. In the preferred embodiment each pixel is an eight bit data word. Thus camera 110 encodes each pixel with one of 256 possible light intensity levels. This image may be formed with an analog television camera whose signal is supplied to an analog to digital converter having an output of eight bits. It is known in the art to provide an illumination source to provide the proper exposure at camera 110.

The gray scale image from camera 110 is supplied to computer 120. Computer 120 is constructed in a manner to optimize image operations. These image operations preferably include: thresholding of the gray scale image into a binary (black/white) image; image repair; location and extraction of the ZIP code within the image; segmentation of the ZIP code into individual digits; classification of the individual digits; and sorting based upon the thus recognized ZIP code.

Computer 120 preferably operates to recognize handwritten characters forming the ZIP code as follows. Following initialization, computer 120 receives the gray scale image data from camera 110. This process preferably includes some indication of the completion of receipt of a valid image from camera 110 such as confirmation that a letter 10 has been viewed by camera 110.

Computer 120 then converts the gray scale image data into digital image data. The recognition process of this invention operates on a digital (black/white) image. Conversion to a black/white image is based upon a threshold gray level, which may be adaptively determined. Pixels having gray scale values below the threshold are converted to black. Those having gray scale values above the threshold ar converted to white. Thus each pixel of the digital image is classified as either a stroke pixel (black) or a background pixel (white).

Computer 120 next repairs the whole digital image. This repair process preferably includes deletion of very long vertical and horizontal lines and deletion of very small marks. This process may also include some preprocessing steps. In the preferred embodiment the image is skeletonized while preserving end points. This results in an image separated into five components:

background; lines one pixel wide, the skeleton; end points of the skeleton; junctions of the skeleton; and flesh or the parts of the repaired image that are not skeleton, end points or junctions.

Computer 120 next analyzes the repaired and preprocessed image for location of the ZIP code block. There is no required location for the ZIP code though it is most often found at the end of the last line of the destination address. Because of the possibility of slanting lines and portions of characters that dangle below or raise above a particular line, it is not a simple process to separate the lines of the destination address block. Likewise it is not simple to determine which portions of a separated address line are the ZIP code. Computer 120 finds the ZIP code within the digital image if it can be found.

If computer 120 founds no such ZIP code block, the ZIP code recognition system fails. No sorting operation is possible for that letter. That letter 10 is deposited in reject bin 25. This is accomplished by failure to operate any of sorters 131, 132, ... 137.

When computer 120 locates a ZIP code block, it then performs additional image repair on the ZIP code block. Because all marks within the ZIP code block should be numerals, it is possible to perform additional, more aggressive repair on the ZIP code block. This is based on the knowledge of the characteristics of numerals.

Computer 120 next separates the ZIP code block into its individual digits, a process called segmentation. This process preferably includes some manner of determining the proper separation of touching or crossing digits. The result of segmentation is a set of digit images corresponding to the individual digits of the ZIP code. Because ZIP codes can include either 5 or 9 digits, there will be either 5 or 9 of these digit images for each letter. Computer 120 may then provides additional image repair on the individual digit images.

Computer 120 then attempts to classify each of the digit images. Classification of digit images includes normalization of these images to a standard size and skew. This normalization process is central to the present invention and will be further detailed below.

Computer 120 next tests to determine if all digit images were recognized. The letter sorting operation cannot be correctly performed unless computer 120 recognizes all the digits. Therefore, if computer 120 does not recognize all the digits the letter is sent to the reject bin 25. Actions performed by computer 120 are then complete for that letter.

If computer 120 recognizes all the digits, then it assembles the individually recognized digits into the ZIP code. Computer 120 next tests to determine if the assembled ZIP code is a valid ZIP code. Not all the possible digit combinations correspond to valid ZIP codes. If the recognized digits correspond to a nonassigned ZIP code, then handwritten digit recognizer 100 cannot make a proper sorting decision. Thus that particular letter 10 is rejected and computer 120 is complete for that letter.

The sorters 141, 142 ... 147 are controlled to sort the letter if the assembled ZIP code is a valid code. This process involves determination of the proper bin for the letter and operation of the appropriate sorter 141, 142 . . . 147 to deposit the letter in that bin. Computer 120 tracks the current location of the letter to determine when it is at the location of the appropriate sorter 141, 142 ... 147. When letter 10 reaches the location of the appropriate sorter 141, 142 ... 147, then computer 120 activates this sorter to deposit the letter in the appropriate bin of ZIP sorted bins 20. Note that the sorting would depend on the location of the sorting office and the customary routing of mail to the various destinations. Actions performed by computer 120 are then complete for that particular letter 10.

Figure 2:
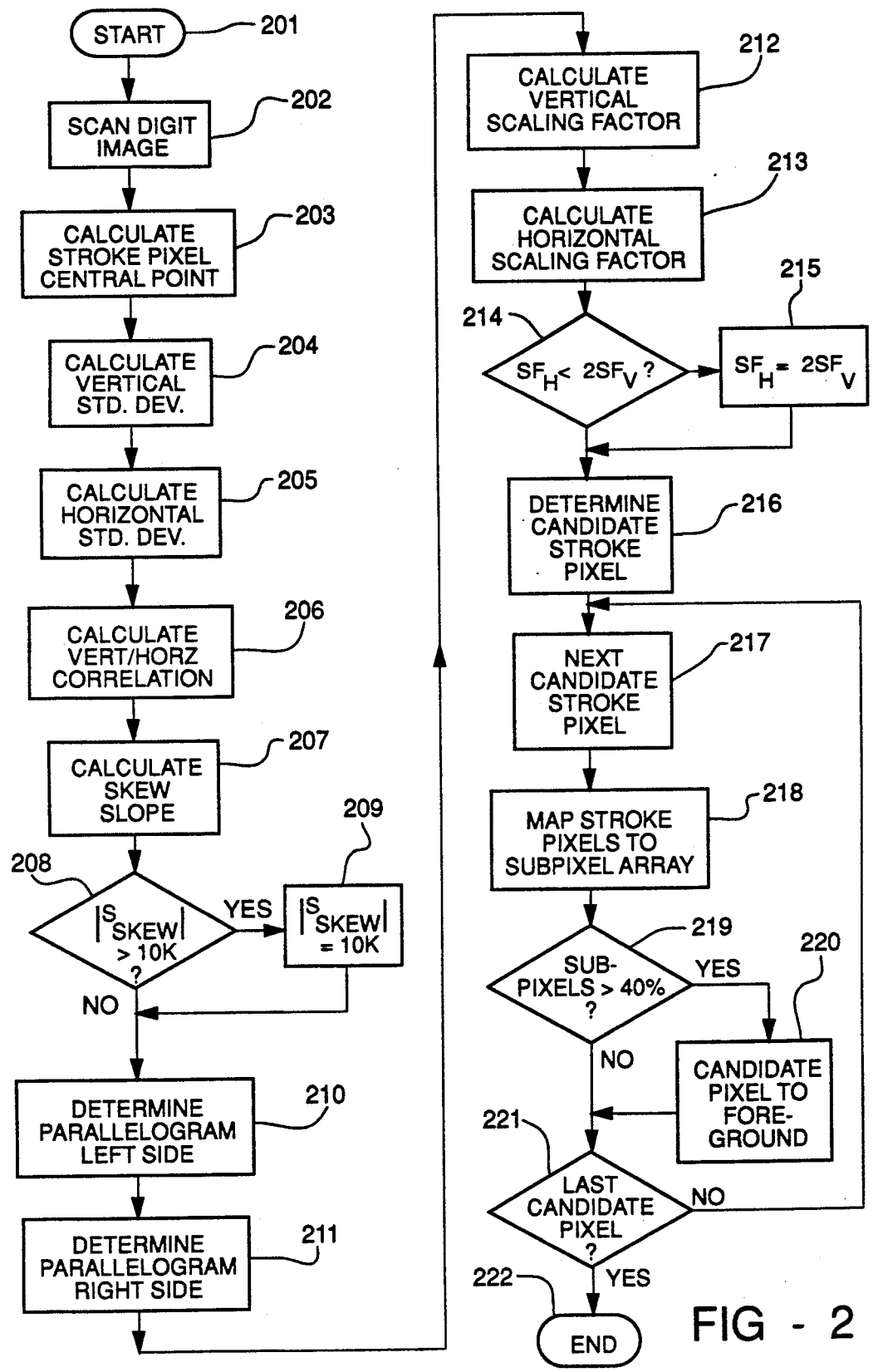
FIG. 2 illustrates in flow chart form the process of digit image normalization of the present invention.

FIG. 2 illustrates a flow chart of program 200 intended to show the operation of the combination of computer 120 for normalizing digit images in accordance with the present invention. Program 200 illustrated in FIG. 2 is not intended to show the exact details of the program for control of computer 120. Instead, program 200 is intended to illustrate only the general operation of computer 120 in digit image normalization.

Program 200 represents a description of the normalization operation of handwritten digit recognition system 100. Program 200 is executed once for each digit image processed by the system. Program 200 is begun via start block 201. Start block 201 represents the initialization required for proper operation of the system. The normalization technique of this invention receives the unconstrained digit images and computes a skew slope (program blocks 202 to 208). This skew slope corresponds to the slant angle of the stroke pixels of the unconstrained digit image. The process next determines a bounding parallelogram (program blocks 209 to 211). The bounding parallelogram has a first pair of horizontal sides and a second pair of sides having the calculated skew slope. This bounding parallelogram has the minimum dimensions that enclose all the stroke pixels of the unconstrained digit image. Finally, this process maps the parallelogram into the standard size rectangle (program blocks 212 to 222). In the preferred embodiment the standard size has 22 rows by 16 columns. This mapping serves to minimize both the size and skew variations while horizontal lines remain horizontal. It is believed that this technique provides more consistent normalized digits than rotation to correct for digit slant. Program 200 is then exited via end block 223. Digit image normalization makes the later recognition task much simpler by permitting recognition to take place on a universe of images with smaller variations and of fixed size.

The normalization technique of the preferred embodiment of the present invention takes the segmented digit image, which may not fill the digit box, and transforms it into a new image within a 22 by 16 box. The normalization process preferably considers the origin of the original digit image pixels to be at their centers to simplify computation of the moments. The normalized digit image resulting from this process considers the origin of its pixels at their upper right hand corner. This simplifies the process of remapping pixels into the standard image size of the normalized digit array.

Figure 3:
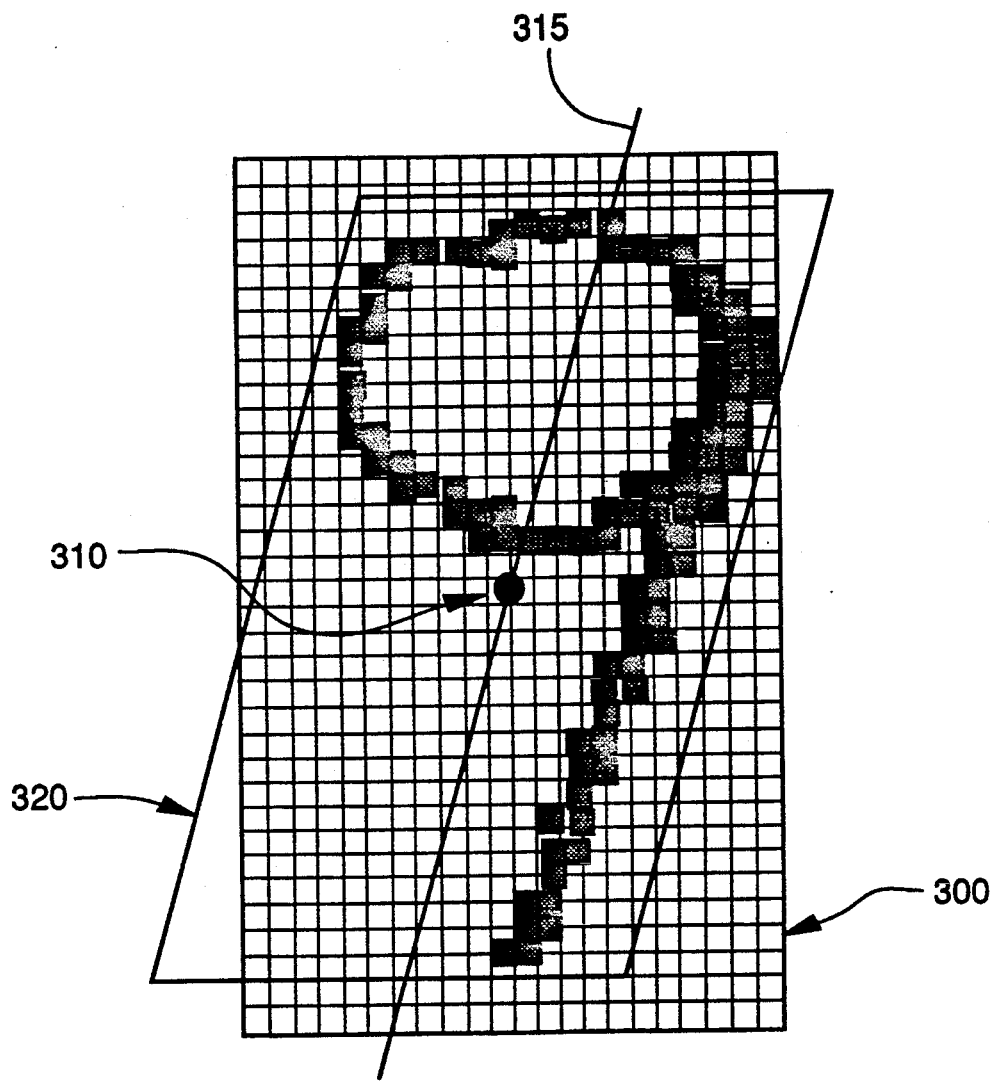
FIG. 3 illustrates various parameters employed in the process of digit image normalization.

The normalization process begins by scanning the digit image for computation of various statistical measures used in normalization (processing block 202). FIG. 3 illustrates a digit image 300 for the digit "9". Digit image 300 consists of foreground or stroke pixels and background pixels. For each stroke pixel cumulative sums of X, Y, $X^2$, $Y^2$ and XY are formed, where X and Y are the respective column and row addresses. In addition the minimum X, maximum X, minimum Y and maximum Y are determined. These quantities are employed in the normalization process.

Next the coordinates of digit center 310 are computed (processing block 203). These digit center coordinates are the average of two measures. The first measure is the centroid location. The centroid location ($X_{Cen}$, $Y_{Cen}$) is computed as follows:

$$(X_{Cen}, Y_{Cen}) = \left( \frac{SumX}{N_P}, \frac{SumY}{N_P} \right) \quad (1)$$

where $N_p$ is the number of stroke pixels in the digit image. The second central measure is the center of the minimum bounding box. The center of the minimum bounding box ($X_{Box}$, $Y_{Box}$) is computed as follows:

$$(X_{Box}, Y_{Box}) = \left( \frac{MaxX + MinX}{2}, \frac{MaxY + MinY}{2} \right) \quad (2)$$

The computed digit center ($X_{DC}$, $Y_{DC}$) is the average of the centroid and the center of the minimum bounding box computed as follows:

$$(X_{DC}, Y_{DC}) = \left( \frac{X_{Cen} + X_{Box}}{2}, \frac{Y_{Cen} + Y_{Box}}{2} \right) \quad (3)$$

Preferably these computed digit center coordinates are then rounded to the nearest integral coordinate.

Next a skew axis slope is computed. This skew slope is based upon the calculated standard deviation in the vertical dimension of the stroke pixels (processing block 204), the standard deviation of the horizontal dimension of the stroke pixels (processing block 205) and the correlation between the horizontal and vertical dimensions of the stroke pixels (processing block 206). This skew axis slope $S_{skew}$ is computed as follows (processing block 207):

$$S_{Skew} = \frac{\sigma Y}{(\sigma X \times CorrXY)} \quad (4)$$

The skew slope $S_{skew}$ is quotient of the Y address standard deviation divided by the product of the X address standard deviation and the correlation between X and Y in the stroke pixels. The magnitude of computed skew slope $S_{skew}$ is limited to 10,000 (processing blocks 208 and 209). Thus if $S_{skew} > 10,000$ then $S_{skew}$ is set to 10,000 and if $S_{skew} < -10,000$ then $S_{skew}$ is set to $-10,000$. A vertical line has an infinite slope. Limiting the calculated value of $S_{skew}$ results in a manageable number is the skew slope is vertical.

The minimum parallelogram 320 which encloses the stroke pixels of the digit image is formed. This parallelogram 320 has horizontal upper and lower sides and left and right sides parallel to skew axis 315. Skew axis 315 is a line having the skew slope $S_{skew}$ which passes through digit center 310. For each row between MinY and MaxY the original digit image is scanned from the left edge to locate the leftmost stroke pixel. The next step determines the left side of the parallelogram (processing block 210). This includes calculating the horizontal distance from the top-left and bottom-left corners of each leftmost pixel to the skew axis. The distance computation must be based upon floating point numbers and not limited to integers. The minimum parallelogram has a left side displaced from the skew axis by the maximum of these left corner distances. The same process determines the right side of the parallelogram (processing block 211). Horizontal distance computations are made from the top-right and bottom-right corners of the rightmost stroke pixel in each of the rows. The right side is displaced from the skew axis by the maximum of these right corner distances. These computations permit computation of the smallest parallelogram having right and left sides parallel to the skew axis which completely encloses the stroke pixels of the digit image.

Identification of this enclosing parallelogram 320 permits calculation of its height H and width W. The height H is the distance along the skew axis from the top side to the bottom side. The width W is the length of the top and bottom sides. Both H and W are calculated in terms of the original pixel dimensions.

Next vertical and horizontal scale factors are computed. The vertical scale factor $SF_V$ is computed to map the parallelogram height H onto the normalized vertical dimension (processing block 212) as follows:

$$SF_V = \frac{22}{H} \quad (5)$$

The horizontal scale factor $SF_H$ is formed in the same manner (processing block 213) as:

$$SF_H = \frac{16}{W} \quad (6)$$

except that the range of $SF_H$ is limited relative to $SF_V$ (processing blocks 214 and 215). If the above computation yields a $SF_H > 2 \times SF_V$, then $SF_H$ is set equal to $2 \times SF_V$. This serves to prevent the normalization process from unduly broadening the strokes of narrow digits such as 1's and prevents amplification of aliasing errors.

The entire original digit image is scanned to locate all the stroke pixels (processing block 216). The four corners of each stroke pixel in the original digit image are mapped onto the normalized digit image using the computed scaling factors. This computation takes place in floating point numbers rather than in integers. Each candidate stroke pixel of the normalized digit image intersecting with any part of a stroke pixel in the original image is thus identified.

The normalized digit image is then formed. The same process repeats for all candidate stroke pixels (processing block 217). First all pixels are set to background. A high resolution scan takes place for each of the normalized digit image pixels identified as intersecting any original image pixel (processing block 218). Each such normalized pixel is divided into a subpixel grid. This subpixel grid may have a variety of dimensions so long as it is square. A 5 by 5 subpixel grid is suitable. The subpixel grid is scanned with each subpixel mapped onto the original digit image. Any subpixel falling within a stroke pixel of the original digit image increments an initially zero total pixel weight. If the total pixel weight for a particular normalized pixel exceeds a predetermined fraction of the maximum weight (processing block 219), then that candidate stroke pixel is set to a stroke pixel (processing block 220). Otherwise the pixel remains a background pixel. This predetermined fraction is preferably about 40% or 10 of the 25 subpixels of the preferred 5 by 5 grid. If that was not the last candidate stroke pixel (processing block 221), then the process repeats for the next candidate stroke pixel (processing block 217). The normalized digit image is complete when this high resolution scan is performed for all identified normalized digit image pixels intersecting any original stroke pixel (end block 222). This subpixel process serves to smooth aliasing errors which might otherwise be introduced. The resulting normalized digit image is employed in the digit recognition process.

I claim:

1. A method for normalization of a character image, comprising the steps of:
   providing a camera capable of sensing a two-dimensional image and a programmed computer configured to receive an image sensed by said camera;
   transferring written material containing a character to be normalized into the field of view of said camera;
   developing a pixelized version of said character image, then, using said programmed computer;
   determining a skew slope corresponding to the slant angle of the stroke pixels of the character image including:
   calculating the standard deviation $\sigma_Y$ of the vertical dimension of the stroke pixels of the character image,
   calculating the standard deviation $\sigma_X$ of the horizontal dimension of the stroke pixels of the character image,
   calculating the correlation CorrXY of the vertical and horizontal dimensions of the stroke pixels of the character image, and
   calculating the skew slope of the stroke pixels of the character image employing the following formula $$S_{skew} = \frac{\sigma_Y}{(\sigma_X \times CorrXY)};$$

determining the bounds of the smallest parallelogram which completely encloses all of the stroke pixels of the character image having a first pair of opposed horizontal sides and a second pair of opposed sides having said skew slope including:
   determining a central point of the stroke pixels of the character image,
   determining a skew axis having a slope equal to said skew slope and passing through said central point of the stroke pixels,
   determining the leftmost stroke pixel of each horizontal row of pixels,
   determining the first horizontal distance between the top-left corner of the leftmost stroke pixel of each horizontal row of pixels to said skew axis,
   determining the second horizontal distance between the bottom-left corner of the leftmost stroke pixel of each horizontal row of pixels to said skew axis,
   determining the maximum of said first and second horizontal distances,
   setting the left side of the parallelogram as a line parallel to said skew axis disposed to the left of said skew axis by said maximum of said first and horizontal second distances,
   determining the rightmost stroke pixel of each horizontal row of pixels,
   determining the third horizontal distance between the top-right corner of the rightmost stroke pixel of each horizontal row of pixels to said skew axis,
   determining the fourth horizontal distance between the bottom-right corner of the rightmost stroke pixel of each horizontal row of pixels to said skew axis,
   determining the maximum of said third and fourth horizontal distances,
   setting the right side of the parallelogram as a line parallel to said skew axis disposed to the right of said skew axis by said maximum of said third and horizontal fourth distances; and
   mapping the stroke pixels of said parallelogram into the standard size horizontal row and vertical column pixel dimensions.

2. The method for normalization of a character image as claimed in claim 1, wherein:
   said step of determining the skew slope of the stroke pixels of the character image further includes
   limiting the absolute value of said calculated skew slope to less than a predetermined number.

3. The method for normalization of a character image as claimed in claim 1, wherein:
   said step of determining a central point of the stroke pixels of the character image includes
   calculating the coordinates $(X_{Cen}, Y_{Cen})$ of the centroid location as follows $$(X_{Cen}, Y_{Cen}) = \left( \frac{SumX}{N_P}, \frac{SumY}{N_P} \right)$$

where: SumX is the sum of the horizontal dimension of each stroke pixel of the character image; SumY is the sum of the vertical dimension of each stroke pixel of the character image; and $N_P$ is the number of stroke pixels in the character image,
   calculating the coordinates $(X_{Box}, Y_{Box})$ of the center of the minimum bounding box as follows $$(X_{Box}, Y_{Box}) = \left( \frac{MaxX + MinX}{2}, \frac{MaxY + MinY}{2} \right)$$

where: MaxX is the horizontal dimension of the stroke pixel having the greatest horizontal dimension; MinX is the horizontal dimension of the stroke pixel having the least horizontal dimension; MaxY is the vertical dimension of the stroke pixel having the greatest vertical dimension; MinY is the vertical dimension of the stroke pixel having the least vertical dimension, and
   calculating the coordinates $(X_{DC}, Y_{DC})$ of the digit center as follows $$(X_{DC}, Y_{DC}) = \left( \frac{X_{Cen} + X_{Box}}{2}, \frac{Y_{Cen} + Y_{Box}}{2} \right).$$

4. The method for normalization of a character image as claimed in claim 3, wherein:
   said step of determining a central point of the stroke pixels of the character image further includes
   rounding the coordinates $(X_{DC}, Y_{DC})$ of the calculated digit center location to the nearest integral coordinate.

5. A method for normalization of a character image, comprising the steps of:
   providing a camera capable of sensing a two-dimensional image and a programmed computer configured to receive an image sensed by said camera;

transferring written material containing a character to be normalized into the field of view of said camera;

developing a pixelized version of said character image, then, using said programmed computer;

determining a skew slope corresponding to the slant angle of the stroke pixels of said character image;

determining the bounds of the smallest parallelogram which completely encloses all of the stroke pixels of the character image having a first pair of opposed horizontal sides and a second pair of opposed sides having said skew slope; and mapping the stroke pixels of said parallelogram into the standard size horizontal row and vertical column pixel dimensions including calculating the length of one of the sides of said parallelogram parallel to said skew axis, calculating a vertical scaling factor from the quotient of the standard vertical column pixel dimensions divided by the length of one of the sides of said parallelogram parallel to said skew axis, calculating the width of said parallelogram, calculating a horizontal scaling factor from the quotient of the standard horizontal column pixel dimensions divided by the width of said parallelogram, determining each stroke candidate pixel within the standard size horizontal row and vertical column pixel dimensions corresponding to any part of a stroke pixel of the character image, dividing each stroke candidate pixel into an array of subpixels, counting the number of subpixels of each candidate stroke pixel which map into any part of a stroke pixel of the character image, and setting a candidate stroke pixel as a stroke pixel if and only if the number of subpixel mapping into a stroke pixel of the character image exceeds a predetermined number.

6. The method for normalization of a character image as claimed in claim 5, wherein:

said step of mapping the stroke pixels of said parallelogram into the standard size horizontal row and vertical column pixel dimensions further includes limiting said horizontal scaling factor to no more that twice said vertical scaling factor.

7. The method for normalization of a character image as claimed in claim 5, wherein:

said predetermined number is about 40% of the number of subpixels per candidate pixel.

8. The method for normalization of a character image as claimed in claim 1, wherein the step transferring written material containing a character to be normalized includes transferring an envelope containing a ZIP-code character to be normalized.

* * * * *